No. 865,464. PATENTED SEPT. 10, 1907.
J. N. WELLER.
CASH REGISTER.
APPLICATION FILED JAN. 24, 1906.

WITNESSES

INVENTOR
John N. Weller
By Cyrus Kehr,
Attorney

No. 865,464.

PATENTED SEPT. 10, 1907.

J. N. WELLER.
CASH REGISTER.
APPLICATION FILED JAN. 24, 1906.

WITNESSES

INVENTOR

UNITED STATES PATENT OFFICE.

JOHN N. WELLER, OF KNOXVILLE, TENNESSEE.

CASH-REGISTER.

No. 865,464.     Specification of Letters Patent.     Patented Sept. 10, 1907.

Application filed January 24, 1906. Serial No. 297,685.

*To all whom it may concern:*

Be it known that I, JOHN N. WELLER, a citizen of the United States, residing at Knoxville, in the county of Knox and State of Tennessee, have invented a new and useful Improvement in Cash-Registers, of which the following is a specification, reference being had to the accompanying drawing.

My improvement relates to cash registers and is particularly applicable to machines for registering amounts put into and taken from the machine by several salesmen.

The machine comprises mechanism making provision for functions as follows: (1) to print upon paper a number or other designation representing each salesman operating the machine; (2) to receive upon a sheet of paper or other record member a written entry by any salesman; (3) to print upon a sheet of paper or other record member numbers representing the sums of money put into the machine by each salesman, coin and paper money being separately recorded; (4) to print upon a sheet of paper or other record member the sums of money taken out of the machine by each salesman, coin and paper money being separately recorded.

The mechanism for printing the designation of each salesman operating the machine comprises a key for each salesman, the depression of which key actuates the printing mechanism necessary for this operation and at the same time unlocks the door affording access to the cash, all the cash being kept in the same general compartment, separated only according to denomination and not separated for the different salesmen.

The hand-written record made by each salesman is made upon a movable sheet or other record member exposed through an opening in one of the exterior walls of the machine, said sheet being, preferably, integral with the sheet upon which the other records are made. The printing mechanism for recording the cash put into or taken out of the machine is associated with a series of money holders, each of which is for a chosen denomination of coin or paper money; and the mechanism is so organized that when any one salesman presses his key for unlocking the machine to afford access to the money holders, the registration of money put into or taken out will be associated with the registration of that salesman's number or other similar designation.

In the accompanying drawings,
Fig. 5 is a sectional plan;
Fig. 8 is a front elevation of said mechanism;
Fig. 14 is a detail perspective of a portion of the locking mechanism.

Referring to said drawings, A is the bottom or floor of the case inclosing the operating mechanism; B is the rear wall; C is the left hand wall; D is the right hand wall; E is the upper wall; and F is the front wall. This is hinged along its lower edge to the front edge of the floor, A, and constitutes the door for affording access to the money holders. G is a door in the rear wall, B.

To the compartment formed by the above mentioned walls is added a lateral extension, H, the rear wall of which is formed by extending the rear wall, B, and the rear door, G, to the left. The bottom, I, of said extension may be located at a higher level than the floor or bottom, A, and the front wall, J, may be located rearward of the front wall, F, of the main portion of the compartment; and the upper wall, K, of said extension is located at an elevation approximately midway between the elevations of the floor, A, and upper wall, E, of the main portion of the compartment, and said front wall, J, may rest closely over the record sheet which is to receive the hand-written and printed records to be hereinafter described, access to said sheet being afforded through an opening, L, in said front wall, J.

Of the operating mechanism located within the compartment formed by said walls, the record sheet, 1, demands first attention. In horizontal lines upon this sheet are to be written and printed the individual transactions, a hand-written record of the item being first at the left, the number or other designation of the salesman next toward the right, and the amount of money put in in connection with the sale and the amount of money taken out in connection with the sale, appearing toward the right, paper money and coin being separately designated. Said sheet is supported upon an upper roller, 2, and a lower roller, 3, the upper end of said sheet being attached to said upper roller and the lower end of said sheet being attached to said lower roller, so that by the rotation of either of said rollers in the proper direction, the sheet may be wound around said roller and drawn from the other of said rollers. The ends of said rollers have, respectively, end journals, 2ª and 3ª, resting in bearings, 4, formed in standards, 5, 5, the left hand of said standards resting in a groove, 6, in the floor or bottom, I, of the extension, H, and the right hand of said standards resting in a groove, 7, in the base or pier, 8, said grooves extending horizontally from the rear toward the front of the machine. A little in front of said rollers and at a height intermediate the elevations of said rollers, a stationary platen, 9, extends from one standard, 5, to the other, the ends of said platen being secured to said standards. Said standards are further joined to each other by horizontal bars, 10. Said standards, platen, bars, 10, and rollers, 2 and 3, together constitute a frame-like structure which can be removed from the machine through the rear door, G, the lower edges of said standards being drawn rearward through the grooves, 6 and 7.

To the forward upper portion of each standard, 5, a ribbon spool, 11, is applied; and from one of said spools to the other extends a ribbon, 12, one end of said ribbon being attached to one of said spools and the other end of said ribbon being attached to the other of said spools, so that when one of said spools is rotated in the proper direction, said ribbon is wound upon said spool and drawn from the other of said spools. Said ribbon is horizontal and extends flatwise across the front face of the record sheet, 1, in front of the platen, 9, and is impregnated with ink or similar color material like a typewriter ribbon. Inasmuch as said ribbon extends horizontally across said record sheet, writing may be placed upon said sheet at any chosen points in a horizontal line behind said ribbon, the handwriting through the opening, L, being accomplished by writing with a pencil or similar instrument upon the ribbon, 12. But the left hand ribbon spool, 11, may be placed far enough to the right to leave the portion of the record sheet behind said opening exposed for directly receiving the writing.

Figure 1:
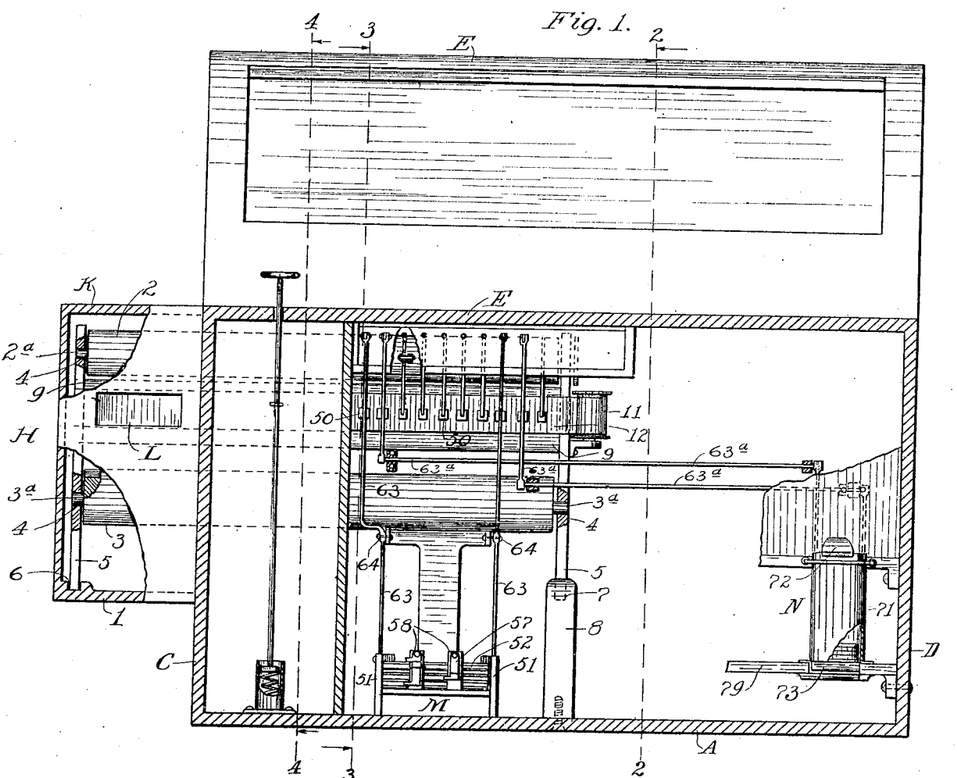
Figure 1 is a sectional front elevation of a machine embodying my improvement.
Figures 2, 4, 10, 11, 18:
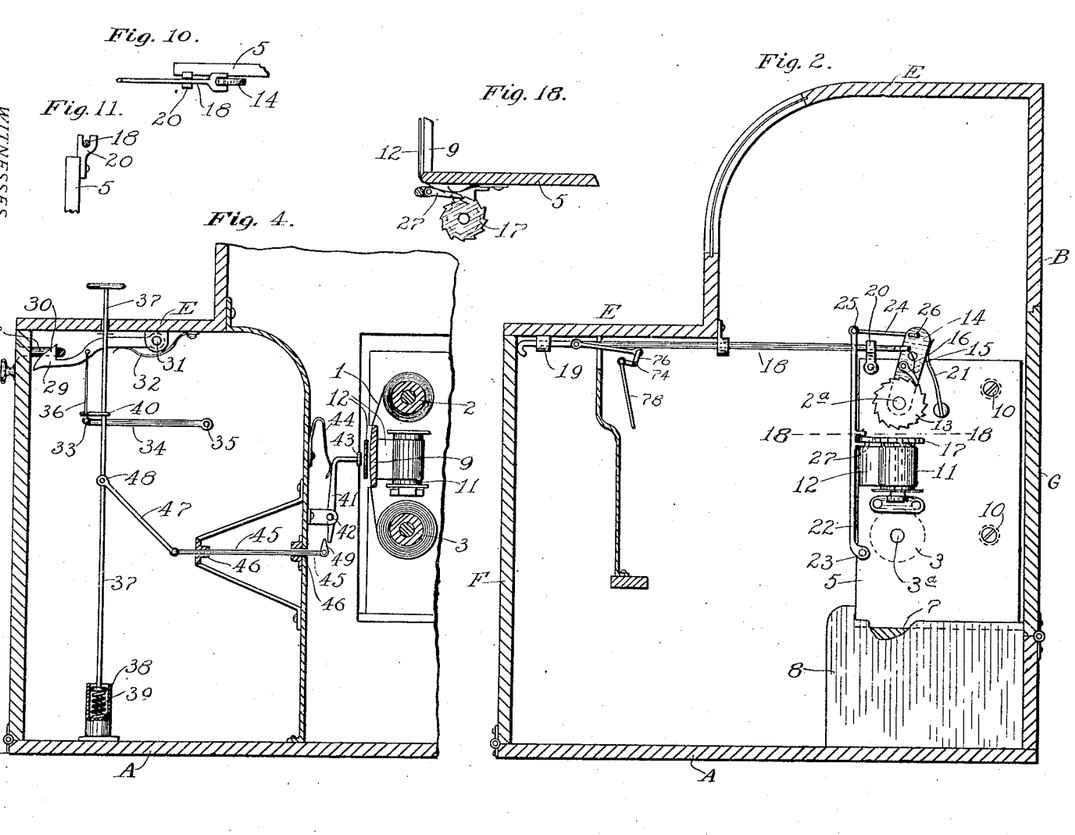
Fig. 2 is a section on the line 2—2 of Fig. 1, looking in the direction of the arrow.
Fig. 4 is a section on the line 4—4 of Fig. 1, looking in the direction of the arrow.
Fig. 10 is a detail of one end of the shift-key.
Fig. 11 is a detail of a bracket for supporting the shift bar.
Fig. 18 is a horizontal sectional detail on the line 18—18 of Fig. 2.

With the rollers, 2 and 3, is associated mechanism for giving said rollers a fractional rotation after the recording of each transaction, in order to shift the record sheet so as to present a new portion of said sheet behind the ribbon, 12, for the next record; and with the ribbon spools, 11, is associated mechanism for giving said spools a fractional rotation after each transaction, in order to shift the ribbon sufficiently to present new portions before the places at which the type make impact. For such fractional rotation of the record sheet rollers, 2 and 3, a ratchet wheel, 13, is secured immovably around the right hand journal of the roller, 2, and between said ratchet wheel and the adjacent standard, 5, the lower end of an oscillatory bar, 14, loosely surrounds said journal, while the upper end of said bar extends above said ratchet wheel and supports a pawl, 15, hinged by one end to said bar and having its other end resting upon said ratchet wheel. A spring, 16, may be applied to said bar and said pawl to normally press the free end of said pawl downward (see Fig. 2). It will be understood that the oscillation of said bar, 14, upon said journal will cause the rotation of said roller, 2, clockwise (as viewed in Fig. 2), the pawl slipping over the teeth of the ratchet wheel when said bar is moved forward and engaging said teeth when the bar is moved backward. And it will be understood that such action will draw the record sheet upward, unrolling it from the lower roller, 3. For the rotation of the ribbon spools, 11, a ratchet wheel, 17, is applied to the right hand of said spools. Said wheel may be one of the rims of said spool. A horizontal shift-bar or shift-key, 18, has its rear end bearing against said oscillating bar, 14, and is supported at its forward portion in a sleeve or guide, 19, and near its rear end in a bracket, 20, (Figs. 2 and 11) extending laterally and upward from the upper forward corner of the right-hand standard, 5. The rear end of said shift-bar may be forked to receive the oscillatory bar, 14, as shown in Fig. 10. The forward end of said bar or key extends against the inner face of the front door, F, and the length of said shift-bar is such as to place the upper end of the oscillating bar, 14, into its rear position when said door has been closed. A blade spring, 21, is attached by its lower end to the standard, 5, while its upper end bears forward against the rear face of the oscillatory bar, 14. As will be readily understood, when the door, F, is opened, said spring, 21, will press the oscillatory bar, 14, and the shift-bar forward, the pawl, 15, slipping over the teeth of the ratchet wheel, 13, and when the door is again closed, said bar is pushed backward by the pressure of the door against the forward end of said key, the oscillatory bar, 14, the spring, 21, and the pawl being pushed rearward, the pawl engaging the ratchet wheel, 13, and giving the latter and the upper roller, 2, a fractional rotation clockwise, as viewed in Fig. 2. It will also be seen that, when the door, F, is open, the shift-bar may be pressed rearward by the hand for the similar shifting of the record sheet.

An upright oscillatory bar, 22, has its lower end hinged at 23, on the right hand standard, 5, while its upper end is coupled to a link, 24, at 25, and the rear end of said link is hinged to the upper end of the oscillatory bar, 14, at 26, so that said oscillatory bar, 22, will move in unison with the oscillatory bar, 14. From said bar, 22, a pawl, 27, extends rearward into engagement with the ratchet wheel, 17, said pawl, 27, and said ratchet wheel, 17, being adapted for action when the oscillatory bar, 22, moves rearward. Thus the rollers bearing the record sheet and the spools bearing the printing ribbon are controlled by the one shift-bar, the record sheet being moved upward and the printing ribbon being moved to the right when said shift-bar is pressed rearward by either the closing of the door, F, or pressure by the hand.

It has already been stated that the frame formed by the standards, 5, 5, the platen, 9, and the bars, 10, 10, is removable through the rear door, G, of the machine; for, as described, the mechanism supported by or constituting portions of said frame being in no manner coupled to other mechanism, the rear end of the shift-bar, 18, merely bearing against the oscillatory bar, 14.

Figures 5, 14:
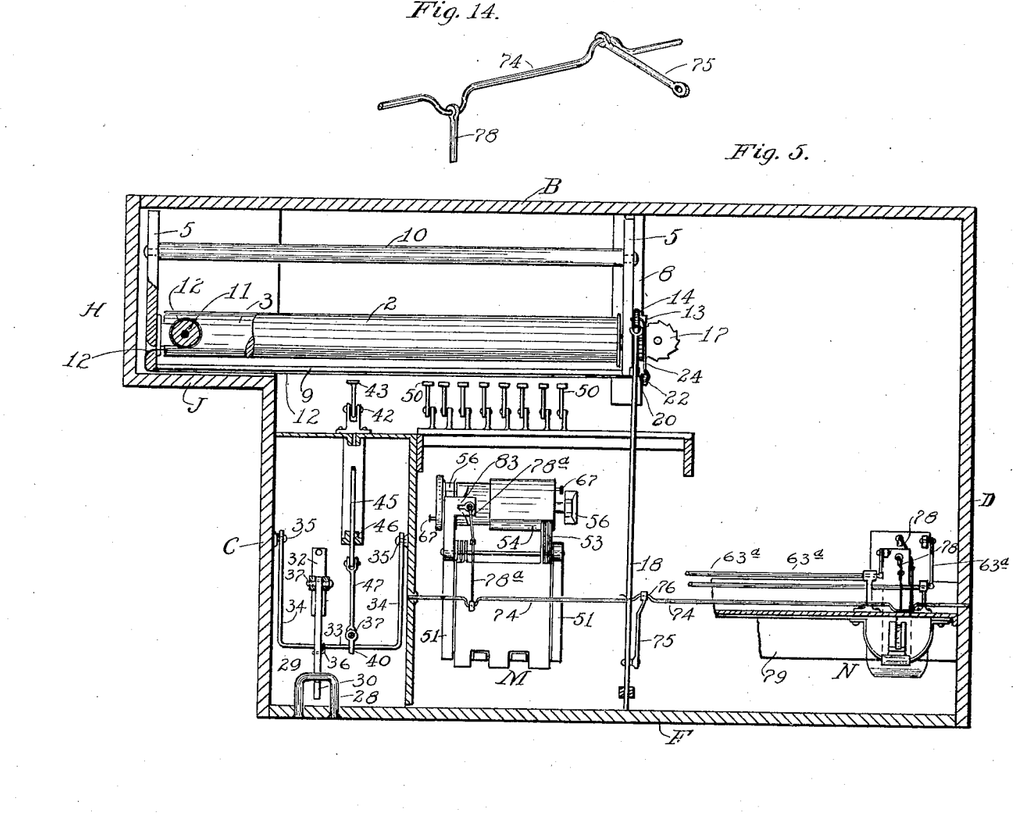
Figure 6:
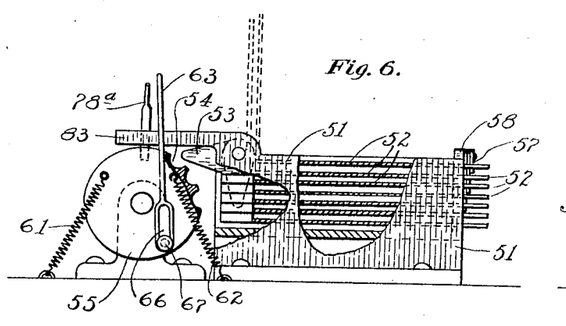
Fig. 6 is an enlarged detail view of one of the holders for paper money.
Figure 7:
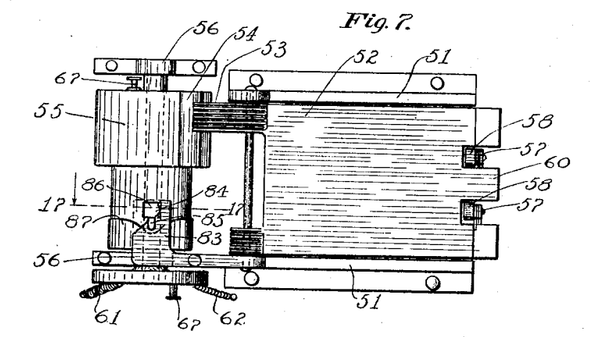
Fig. 7 is a plan of the mechanism shown in Fig. 6.
Figure 8:
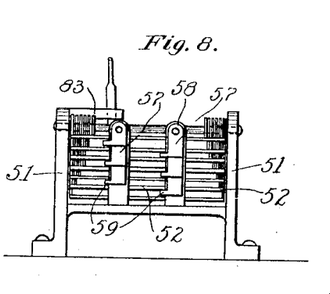
Figure 9:
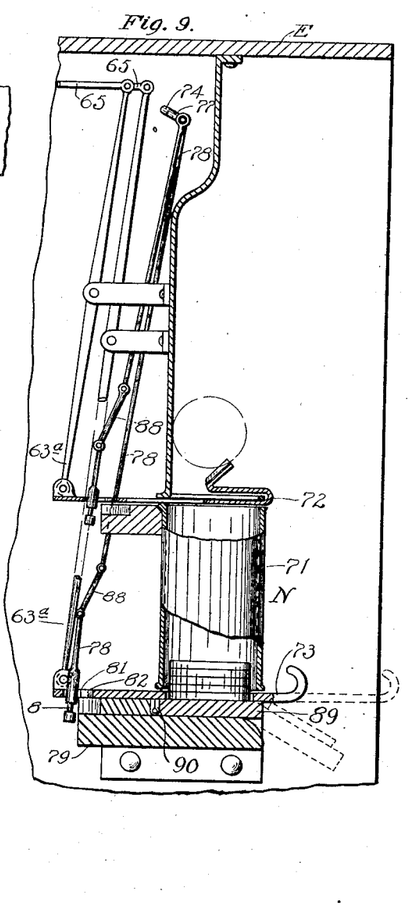
Fig. 9 is a detail sectional view of one of the holders for coin money.

The unlocking keys and the money holders will now be described; and it is deemed sufficient to illustrate and describe only one of each of said members. As already described, the front wall, F, is a door hinged along its lower edge. On its inner face near its upper left hand corner is a staple, 28. (Figs. 4 and 5.) Adjacent said staple is a hook-bar, 29, having its hook, 30, normally extending into said staple from below and having its other end hinged on a horizontal axis at 31, said hinge being supported from the upper wall of the casing. A spring, 32, is arranged to press upward against said hook-bar so that the latter is normally held in the elevated position. The forward portion of said hook is tapered downward, so that when the door is opened and is being pressed rearward for closing, said staple will bear against said oblique face and press the free end of said hook-bar downward until said hook can enter the staple. By this means, the door is locked automatically upon closing. Beneath said hook-bar is a horizontal oscillating yoke, 33, having its arms, 34, extending rearward and hinged at 35. The upper end of a link, 36, is secured to said hook-bar and the lower end to said yoke, so that the depression of the front portion of said yoke will cause the link, 36, to draw said hook-bar downward out of engagement with the staple, 28. An upright shaft-form key, 37, extends downward through the upper wall, E, of the machine, passes near said yoke, and enters by its lower end an upright tubular column, 38, and therein rests upon an expanding coiled spring, 39. Said spring normally holds said key in the elevated position. Immediately above the yoke, 33, a rigid arm or bracket, 40, extends horizontally from the key, 37, across said yoke above the latter, so that when said key is depressed, said yoke is also depressed and the free end of the hook-bar, 29, is drawn downward for the unlocking of said door. Said key is to be depressed by a salesman to open the door to afford access to the money holders; and there may be a plurality of such keys, one for each salesman. And in operative connection with each key there may be mechanism for printing upon the record sheet a number or other designation for the salesman represented by said key. For such printing, an upright type bar, 41, is hinged between its ends at 42 and bears at its upper end a type head, 43, which supports a type face adapted to print a character upon the record sheet. A spring, 44, bears rearward against the upper end of said type bar. Approximately in line with the lower end of said type bar is a horizontal slide bar, 45, supported in guides, 46, and coupled by its forward end to an oblique link, 47, the forward end of which link is higher than its rear end and hinged at 48 to the key, 37. As is obvious from an inspection of the drawings, the downward pressure of said key will cause the rearward movement of said link and said slide bar. Upon the rear end of said slide bar is an upward directed tooth or cam, 49, adapted to engage the lower end of the type bar, 41, and press said end rearward until said tooth slips beneath said end and allows the spring, 44, to impel the upper end of said type bar rearward against the printing ribbon, whereby an impression is made by the type upon said type bar through said ribbon upon the record sheet. Other type bars, 50, similar to the type bar, 41, are arranged in front of the printing ribbon and record sheet at the right of the type bar, 41, and these are suitably connected with the money holders, to be hereinafter described, to cause one of said type bars to print upon the record sheet as often as one of the money holders is operated, either for the removal of money therefrom or the placing of money therein.

M is a holder for paper money and N is a holder for coin. Each of these holders is intended to contain money of only one denomination. For example, the holder, M, may contain $1.00 paper bills, while the holder, N, may contain 50-cent silver coins. The holder, M, has upright walls, 51, parallel to each other and parallel to the walls, C and D, of the case. Between these walls are placed a number of horizontal plates, 52, each having its rear end hinged to the said walls, 51, and having a rearward arm, 53, adapted to enter one of the grooves, 54, in the rocker, 55, mounted in bearings, 56, rising from the floor, A, at the rear of said holder. Said plates may be turned up one after another on their hinges, the uppermost being turned first. Each arm, 53, is outside of the grooves, 54, on said rocker when the plate from which said arm projects is in the horizontal position, so that said rocker is free to turn in response to the engagement of the arm, 53, of any of said plates. Only one bill is placed beneath each plate, 52. If a salesman is to take out a bill for making change, he raises the uppermost plate, and in so doing the arm, 53, of said plate enters one of the grooves, 54, in said rocker, 55, and presses downward upon the rib between said groove and the next lower groove, and thereby gives said rocker a partial rotation, and when said plate has been turned to its limit upon its hinge, said arm will have turned far enough to pass out of said groove and leave said rocker free to be rotated by the arm of another plate. If another bill is to be taken out of the holder, the next lower plate is similarly raised, and the rocker, 55, is given another partial rotation in the same direction, and so on for all of the plates below those already mentioned. If a bill is to be put into the holder, it is placed upon the then uppermost horizontal holder and the holder next above that is then pulled downward into the horizontal position; and during this movement, the arm, 53, of said plate enters one of the grooves, 54, of said rocker, 55, and presses the rib above said groove and thereby gives said rocker a partial rotation in the direction opposite that given the rocker by the lifting of the plates, 52. Thus one bill after another may be inserted and one plate, 52, after another turned downward, the rocker, 55, being given a corresponding number of partial rotations. To prevent the simultaneous lifting of more than one of said plates, gravity stops, 57, are placed at the front of said holder. Said stops are hinged by their upper ends to standards, 58, and have lateral arms, 59, extending above one of the plates, 52, when said stop is in its normal position. Opposite said arm, 56, the next higher plate, 52, has an extension, 60, occupying the space between the adjacent standards, 58, and extending far enough forward from between said standards to prevent the swinging of said stop in the direction of said extension.

A contracting spring, 61, is attached by one end to the rocker, 55, above the axis of the latter and by its other end to a relatively stationary portion of the machine, rearward of the rocker, and a similar spring, 62, is similarly applied to the rocker by one end and by its other end to a relatively fixed portion of the machine forward of the rocker. The function of said springs is to turn said rocker upon its bearings into its normal position as often as one of the arms, 53, has engaged and turned said rocker. The movements of the grooved rocker, 55, in response to the movements of the plates, 52, of the money holder, are utilized for actuating two of said type bars, the impressions made by one of said type bars representing the upward movements of the plates, 52, and the impressions made by the other of said type bars representing the downward movement of said plates. Connection between said roller and said type bars is made as follows: For making such impressions, the type bars, 50, are used. (See Fig. 3.) The heads of the type bars are at the lower ends of said bars. Two of said type bars are connected with the rocker, 55. Such connection with each of said two bars is formed by an upright lever, 63, hinged between its ends at 64 and a horizontal slide bar, 65, supported in suitable guides. One of said levers, 63, has at its lower end a slot, 66, into which extends a crank pin, 67, supported by one end of the rocker, 55, and the other of said hinged levers has a similar slot, 66, into which extends a similar crank pin, 67, located at the opposite end of the rocker, 55, and at the opposite side of the axis of said rocker. By means of such connection to the rocker, the lower ends of said levers are moved in opposite directions when the rocker is moved in either direction, and if the movement of the rocker is reversed, the movement of said levers is also reversed. Each slide bar, 65, is hinged by its forward end to one of said hinged levers and has at its opposite end a tooth, 68, adapted to engage the upper end of one of said top bars when said slide bar is moved backward until said tooth has slipped over the end of said bar, as already described of the type bar, 41. To the lower end of each of said type bars is applied a spring, 69, which impels the head of the type bar against the printing ribbon when the type bar becomes released from the slide bar, 65. Inasmuch as the two levers, 63, move in opposite directions when the rocker, 55, is actuated, and the rocker is actuated in one direction when one of the plates, 52, is raised and in the other direction when said plate is lowered, it follows that one of said slide bars is moved rearward and actuates one of said type bars while the other of said slide bars is simultaneously moved forward away from the other of said type bars, so that only one of said type bars makes an impression for each movement of said rocker, in whichever direction said movement may be. Thus the impressions made by one of said type bars may stand for the downward movement of one of the plates, 52, while the impressions made by the other of said type bars stands for the upward movement of one of said plates. As already stated, the springs, 60 and 61, restore the rocker, 55, to its normal position after each movement of one of the plates, 52.

Figure 12:
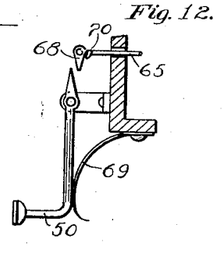
Figs. 12 and 13 are detail views of mechanism for operating a type bar.
Figure 13:
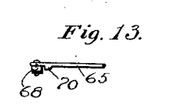
Figure 16:
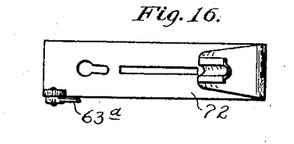
Fig. 16 is a detached plan of the upper slide plate of the coin-receiving mechanism.
Figure 17:
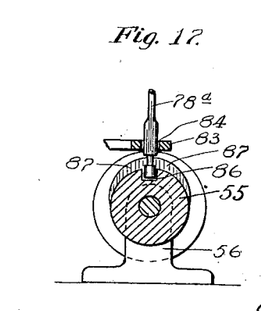
Fig. 17 is an upright sectional detail of a portion of the mechanism for receiving paper money.

Any suitable means of construction may be employed to permit the engagement of the type bars only during the rearward movement of the slide bars, 65. For this purpose, Figs. 12 and 13 show the tooth, 68, hinged by its upper end to the slide bar, 65, and resting against a stud or shoulder, 70, projecting laterally from said slide bar, so that when said bar is pressed rearward and said tooth is thereby made to bear against the end of the adjacent type bar, the tooth bears against said stud or shoulder and is thereby prevented from turning from its hinge, and the upper end of the type bar is accordingly moved rearward until said tooth has slipped over the end of said type bar. But when said slide bar, 65, again moves forward and again brings the tooth, 68, into engagement with the type bar, said tooth turns upon its hinge and slips over the end of the type bar without shifting the latter.

As already herein stated, each such holder for paper money is designed for only one denomination. An additional holder is to be used for each additional denomination, and a pair of type bars and intermediate connections applied to each such holder.

The coin holder, N, consists of an upright cylindrical tubular body, 71, having an interior diameter a little larger than the coins of the denomination for which the holder is to be used, and an upper slide, 72, for admitting coins and a lower slide, 73, for withdrawing coins. Each of said slides moves horizontally and each is connected by its rear end to one arm of a rock-shaft, 63$^a$, corresponding to the hinged levers, 63, already described as being joined to the rocker, 55, and the other arms of said rock-shafts are each placed in operative relation with a type bar by means of a slide bar, 65, as already described in connection with the said rocker, 55, and the money holder, M. It will be observed that the forward movement of the slide, 72, or the slide, 73, will cause the rearward movement of the corresponding slide bar, 65, whereby an impression is made by the corresponding type bar. Thus the said holder, N, cannot receive one of the coins without a movement which results in an impression by one of the type bars, and said holder cannot deliver or discharge one of said coins without a movement which results in an impression by another of said type bars. But the mechanism, as thus far described, is not adapted for registering more than one deposit nor more than one withdrawal of either paper money or coin of the same denomination without shifting the record sheet so as to bring new portions of said sheet into position to receive impressions from the type bars. For example, if a half dollar coin is withdrawn from the holder, N, and the impression is made by the proper type bar upon the record sheet, and then the slide, 73, is again drawn forward for the withdrawal of another half dollar, the impression by the corresponding type bar is placed upon the former impression, unless the record sheet has, in the meantime, been shifted. Obviously, each salesman may accomplish such shifting between similar operations; but as such action by the salesman may be intentionally or inadvertently omitted, I have devised mechanism for locking each money holder, after each operation, such locking remaining effective until the shift bar, 18, has been again pressed rearward. Such locking mechanism will be next described.

Figures 3, 15:
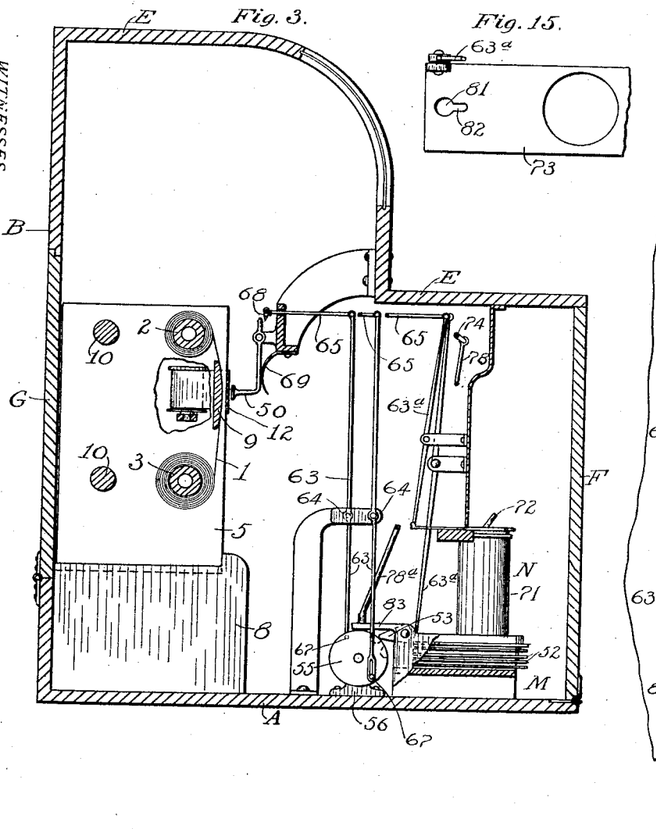
Fig. 3 is a section on the line 3—3 of Fig. 1, looking in the direction of the arrow.
Fig. 15 is a plan of a portion of a coin holder slide plate associated with the locking mechanism.

In Fig. 4, 74 is a rock shaft extending horizontally through the upper portion of the apparatus parallel to the front wall of the casing. Adjacent the shift bar, 18, said rock shaft has a downward directed crank, 76, and a pitman, 75, is coupled by its rear end to said crank and by its forward end to said shift bar, so that when said shift bar is pressed rearward, the lower portion of said crank is pressed rearward and said rock shaft is given a corresponding partial rotation. Adjacent the coin holder, N, said rock shaft has a crank, 77, from which is suspended a pitman-form shaft, 78. Said shaft, 78, extends through an aperture, 81, in the lower slide, 73, immediately behind the support, 79, when said slide is in its rearmost position, so that when said shaft is in its lower position it will bear against said support and prevent the forward movement of said slide. Said shaft has an annular groove, 80, near its lower end, and the aperture, 81, has a contracted lateral forward extension, 82 (Fig. 15). The rock shaft, 74, is located a little forward of a plane extending upward from and parallel to the rear face of the support, 79, so that the upper portion of the shaft, 78, leans forward. Hence the lower end of said shaft, 78, will bear by gravity forward in the aperture, 81, and when said shaft is lifted by the turning of said rock shaft, 74, until the groove, 80, is opposite the extension, 82, said shaft will slip into said extension, the portion of said shaft immediately above said groove resting upon the top of the slide, 73. In this position, the lower end of said shaft will clear the support, 79, and permit the forward movement of said slide. When the slide, 73, is drawn forward, the lower end of said shaft, 78, is pushed rearward out of the extension, 82, and falls downward by gravity as far as permitted by the support, 79, and when said plate is again moved rearward, said shaft, 78, falls downward behind the support, 79, and prevents the slide from again moving forward until said shaft, 78, has been raised. A similar pitman shaft, 78, is in the same manner applied to the upper slide, 72, and the rock shaft, 74. And a similar pitman shaft 78ª is similarly applied to the money holder, M, to prevent the movement of the rocker, 55, a second time excepting when the shift bar, 18, has been in the meantime actuated. For this purpose a bracket, 83, is applied to one of the walls, 51, of the holder, M, immediately above the rocker, 55, and an aperture, 84, corresponding to the aperture, 81, extends through said bracket, and said aperture has a lateral extension, 85, into which said pitman shaft moves by gravity when the groove of said shaft is at the proper elevation. Beneath said shaft, said rocker has a cavity, 86, into which said shaft may extend when free from the lateral extension, 85, and the rocker is in its normal position. Upon the rocker, adjacent said cavity are cam faces, 87, properly located to push the lower end of said shaft to the right when the rocker approaches either one of its two positions, whereby said shaft is freed from the bracket, 83, and permitted to fall into the cavity, 86.

Each rearward movement of the shift bar, 18, shifts the record sheet upward and simultaneously lifts all of the pitman shafts, 78 and 78ª, which are then locked. To permit the downward movement of the cranks on the rock shaft, 74, supporting the several pitman shafts, 78 and 78ª, while a portion of said pitman shafts are in the elevated position, suitable provision may be made for play or slack between said rock shaft and said pitman shafts. This may be accomplished by interposing a link, 88, between said rock shaft and said pitman shaft.

If any coin-holder operation is to be repeated during the recording of any transaction, the shift bar, 18, is to be pressed rearward by hand for the movement of the rock shaft, 74, and the consequent lifting of the pitman shaft, 78, or 78ª, which is to be released for the unlocking of the money holder the operation of which is to be repeated.

To the lower face of the slide, 73, is applied a plate, 89, the rear portion of said plate being secured immovably to the rear portion of the slide, 73, and said plate being divided transversely at 90 and the two portions there hinged to each other so that the front portion is free to fall partially downward like a table leaf when the slide, 73, is drawn forward. The portion of said plate which thus falls constitutes a sliding and falling support upon which the coin rests while the slide, 73, moves forward and from which, when it falls, the coin slides into the hand of the operator.

I claim as my invention:

1. In a machine of the nature described, the combination with a casing, of mechanism for carrying a record sheet, hinged type-bars adjacent the position for said record sheet, springs for pressing said type-bars toward said sheet, money holders located within said casing and adapted to receive and deliver pieces of money singly, and mechanism in operative relation with said holders for moving said type-bars in opposition to said springs, substantially as described.

2. In a machine of the nature described, the combination with a casing, of mechanism for carrying a record-receiving member, printing mechanism for making records upon said member, and a paper money holder comprising a group of superposed hinged plates in operative relation with said printing mechanism, substantially as described.

3. In a machine of the nature described, the combination with a casing, of mechanism for carrying a record-receiving member, printing mechanism for making records upon said member, a rocker, 55, in operative relation with said printing mechanism, and a paper money holder comprising a group of superposed hinged plates in operative relation with said rocker, substantially as described.

4. In a machine of the nature described, the combination with a casing, of mechanism for carrying a record-receiving member, printing mechanism for making records upon said member, a paper money holder comprising a group of superposed hinged plates in operative relation with said printing mechanism, and gravity stops for controlling said plates, substantially as described.

5. In a machine of the nature described, the combination with a casing, of mechanism for carrying a record-receiving member, printing mechanism for making records upon said member, a rocker, 55, in operative relation with said printing mechanism, a paper money holder comprising a group of superposed hinged plates in operative relation with said rocker, and gravity stops for controlling said plates, substantially as described.

6. In a machine of the character described, the combination of money holders adapted to receive and deliver pieces of money singly; mechanism for carrying a member for receiving a record; mechanism in operative relation with said holders for making upon said member a record of the pieces of money put into and taken out of said holders; and mechanism for locking said holders against the repeating of operations without intermediate shifting of said record-receiving member, substantially as described.

7. In a machine of the character described, the combination with a casing, of money holders located within said casing and adapted to receive and deliver pieces of money singly; mechanism for supporting a member for receiving a record; mechanism in operative relation with said holders for making upon said member a record of the pieces of money put into and taken out of said holders; a door in said casing for affording access to said holders; mechanism for actuating the mechanism for supporting said record-receiving member, said mechanism being in operative relation with said door; and mechanism for locking said holders against the repeating of operations without intermediate shifting of said record-receiving member, substantially as described.

8. In a machine of the nature described, the combination with a casing, of money holders adapted to receive and deliver pieces of money singly, mechanism for carrying a member for receiving a record, mechanism in operative relation with said holders for making upon said member a record of the pieces of money put into and taken out of said holders, a door for said casing, mechanism in operative relation with said door for locking said holders against the repeating of operations without intermediate shifting of said record-receiving member, substantially as described.

9. In a machine of the nature described, the combination with a casing comprising a door, holders adapted to receive and deliver pieces of money singly, mechanism for carrying a member for receiving a record, mechanism in operative relation with said holders for making upon said member a record of the pieces of money put into and taken out of said holders, a rock-shaft in operative relation with said door, and locking mechanism in operative relation with said rock-shaft for locking said holders against the repeating of operations without intermediate shifting of said door, substantially as described.

In testimony whereof I have signed my name, in presence of two witnesses, this tenth day of January, in the year one thousand nine hundred and six.

JOHN N. WELLER.

Witnesses:
CYRUS KEHR,
CARRIE R. IVY.